Oct. 29, 1946.   J. A. H. BARKEIJ   2,410,333
HYDRAULIC MECHANISM
Filed April 29, 1940    6 Sheets-Sheet 1

INVENTOR.
J.A.H. Barkeij

Oct. 29, 1946.    J. A. H. BARKEIJ    2,410,333
HYDRAULIC MECHANISM
Filed April 29, 1940    6 Sheets-Sheet 2

INVENTOR.
J.A.H.Barkeij
BY

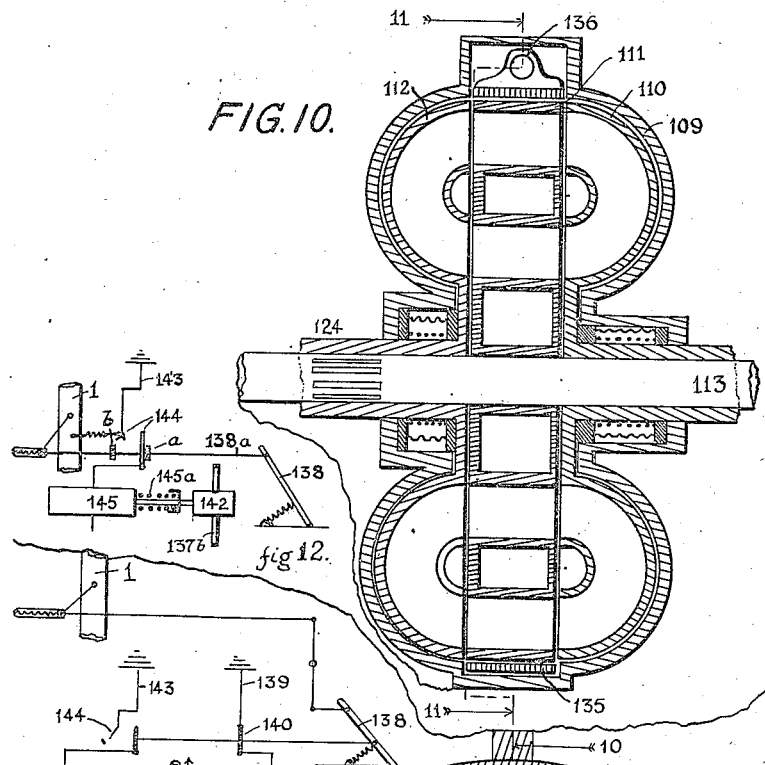
FIG. 10.
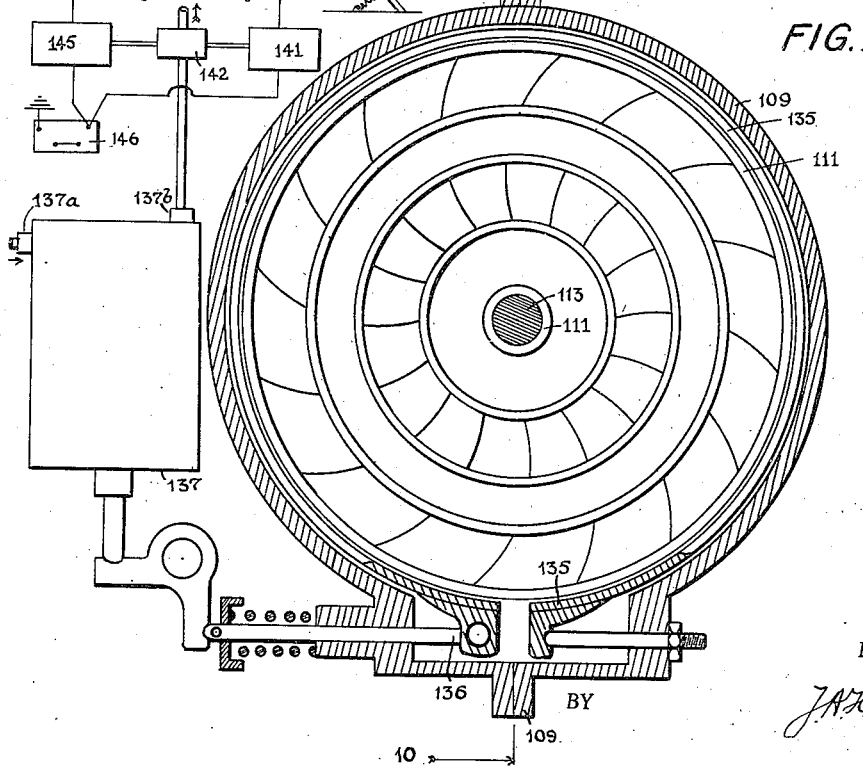
FIG. 11.
fig 12.
INVENTOR.
J. A. H. Barkeij
BY

Inventor
J.A.H.Barkeij

Oct. 29, 1946.  J. A. H. BARKEIJ  2,410,333
HYDRAULIC MECHANISM
Filed April 29, 1940  6 Sheets-Sheet 6

Inventor
J.A.H.Barkeij

Patented Oct. 29, 1946

2,410,333

UNITED STATES PATENT OFFICE 2,410,333

HYDRAULIC MECHANISM

Jean A. H. Barkeij, Altadena, Calif.

Application April 29, 1940, Serial No. 332,522

35 Claims. (Cl. 74—189.5)

My invention relates primarily to hydraulic power transmission and more particularly with that kind of transmission which is called the Foettinger type of hydraulic coupling or hydrokinetic torque converter.

My first object is to arrange hydraulic mechanism in such a way with other mechanism or planetary gearing in general so as to reduce the relative speeds of the impeller and runner of the hydraulic mechanism to a minimum thereby increasing the efficiency of a hydraulic mechanism.

My second object is to combine a planetary gearing with a hydrokinetic coupling or converter in such a way that the usual creeping tendency exerted on the vehicle by such couplings, and/or converters, is entirely eliminated. With creeping tendency is meant the tendency of such a drive to move the vehicle forwards with the engine idling.

My third object is to associate said second object with a free-wheel mechanism tending to prevent the exertion of backward drive to the vehicle, said freewheel allowing only a forward motion but no backward motion, unless eliminated.

Other objects will appear hereinafter during the discussion of the various figures.

Figs. 1 to 7 are diagrammatical drawings to explain the principle of my invention.

Fig. 8 shows the combination of a prime mover with a hydrokinetic torque converter, the prime mover being connected to one driving shaft of a planetary gearing, the planetary carrier of said gearing and the other, driven, shaft being in driving connection with each other through said converter, and said other shaft being in driving relation to a vehicle carrying said combination, preferably through a gear reduction drive.

Fig. 9 shows the combination of a hydrokinetic coupling and a prime mover, said motor being connected to the impeller of said coupling and the runner thereof being connected to an overdrive between said runner and the housing or carrier of a planetary gearing, having two shafts extending therefrom, one being connected to said motor and said impeller, and the other shaft being geared to the pinion gears rotatably arranged on said planetary carrier, and in driving connection with the gear drive of a vehicle carrying said combination.

Figs. 10 and 11 show the combination of a torque converter and fluid clutch in one, and mechanism to change one into the other during the rotation thereof. Fig. 10 shows Fig. 11 on the section line 10—10 of Fig. 11, and Fig. 11 shows Fig. 10 on the section line 11—11 thereof.

Fig. 11 shows further mechanism or means to control the conversion of the converter into a coupling and conversely, by the driver at will and preferably in connection with the fuel control element of the prime mover.

The same idle runner, however, may be used, to drive the runner slightly in opposite direction as we will explain hereinafter.

Fig. 12 show a modification of Fig. 11, in which the driver controls the device of Figs. 10 and 11 by means of a single solenoid, instead of two.

Fig. 13 shows that the planetary gearing may be so arranged that the two intermediate side gears (4a and 7) may be connected with the impeller and runner of the hydrokinetic mechanism and the planetary carrier may be connected with the propeller shaft for instance by means of an intermediate gearing 15 and 16 to the driven mechanism, as for instance a vehicle.

Figures 5, 15:
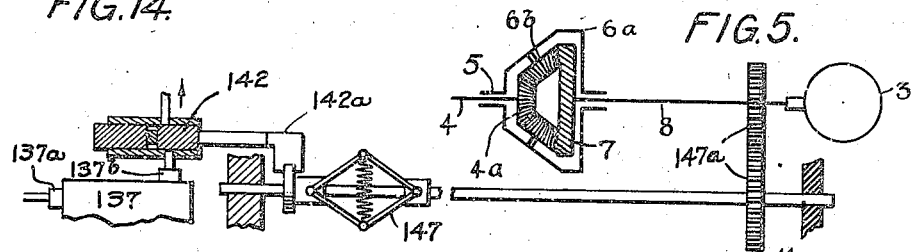
Fig. 15 shows a centrifugal governor controlling a valve to release the pressure in an oil-pressure pump, in order to release the brake mechanism to stop the vanes of the rotor 111 shown in Figs. 10 and 11.
Figure 8:
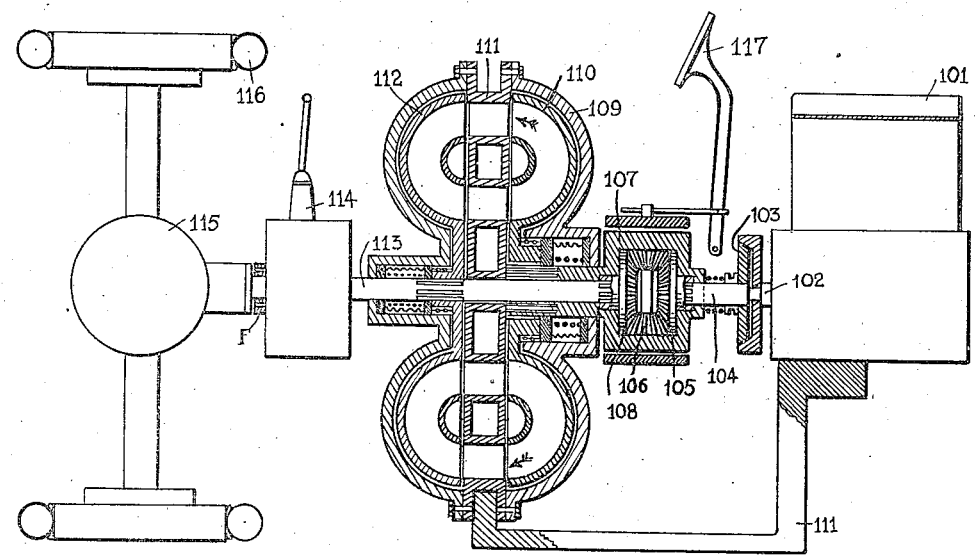
Figure 16:
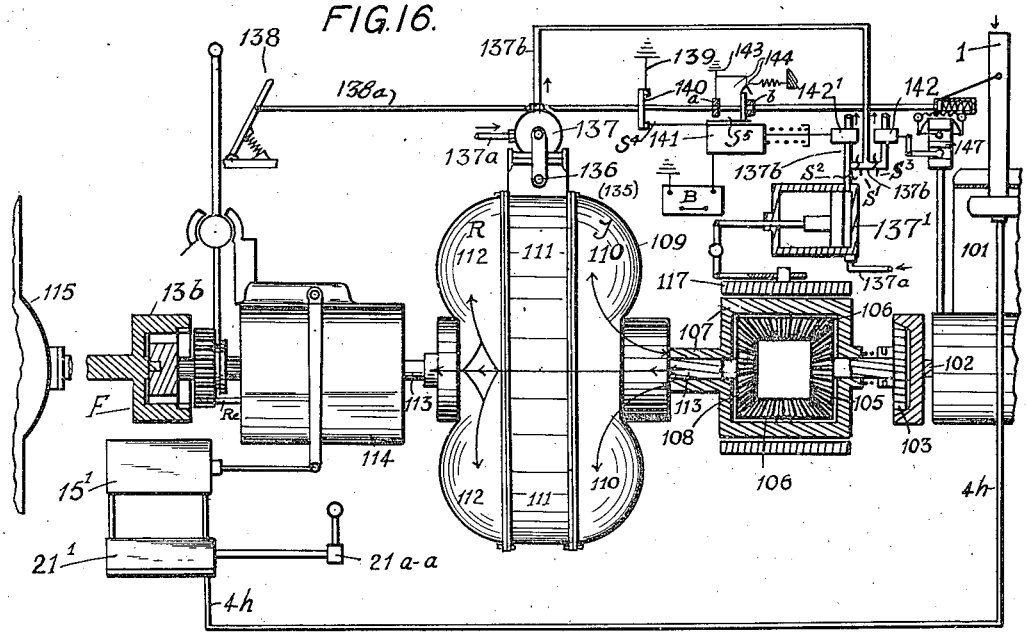

Fig. 16 shows the combination of the Figs. 8, 11 and 15. The brake 117 operates on the planetary carrier and the impeller connected therewith. The brake 135 operates on the idle runner 111 of Fig. 11. The meaning of the separation lines $S^1$, $S^2$, $S^3$ are explained hereinafter. The accelerator 138 operates either on the brake 117, or on the brake 135. The governor 147 operates only on the brake 135.

Figure 3:
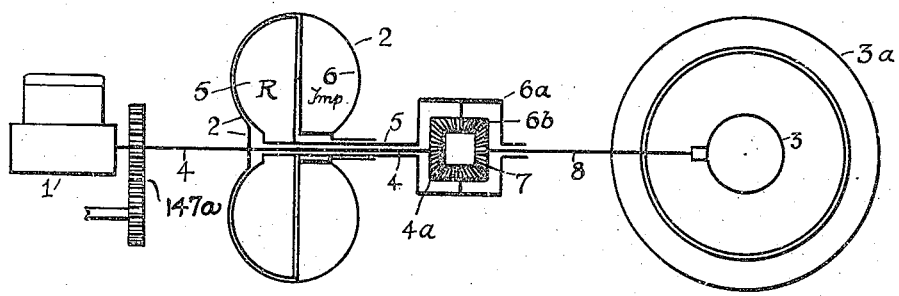
Figure 7:
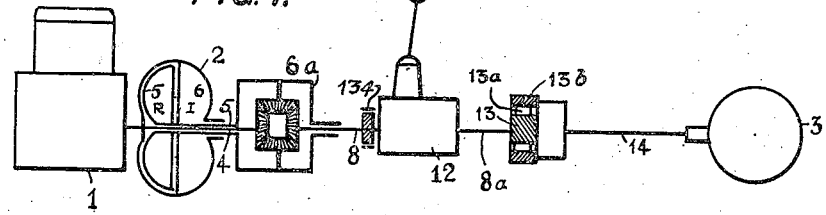
Figure 9:
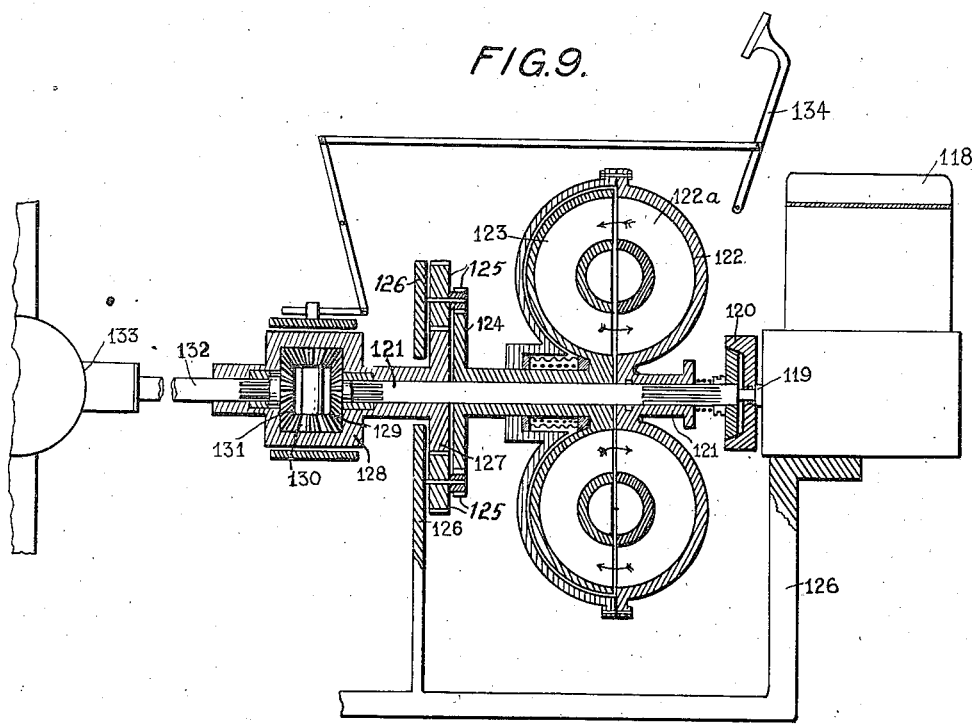
Figure 17:
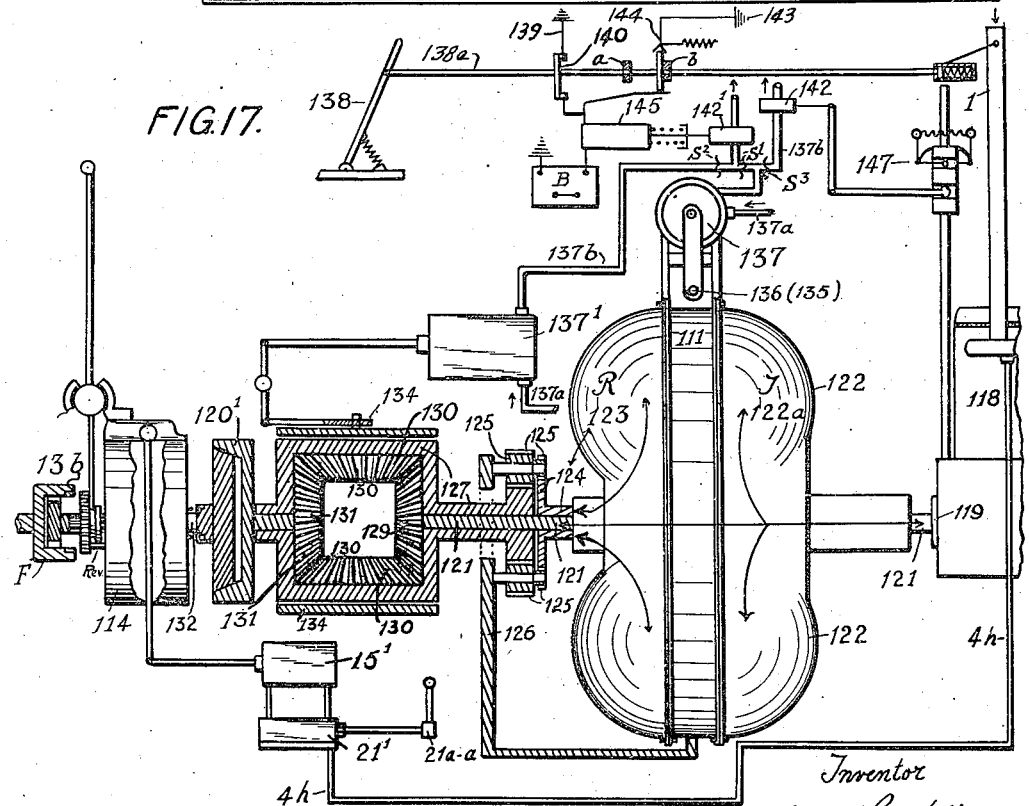

Fig. 17 shows a combination of the features of Figs. 3, 7 or 9 with 11, and 15. The brake 134 operates on the planetary carrier or differential housing and the runner connected therewith. The brake 135 operates on the idle runner 111 of Fig. 11. The accelerator controls either the brake 134 or the brake 135. The governor 147 controls only the brake 135. The meaning of the separation lines is the same as that of Fig. 16.

Figure 1:
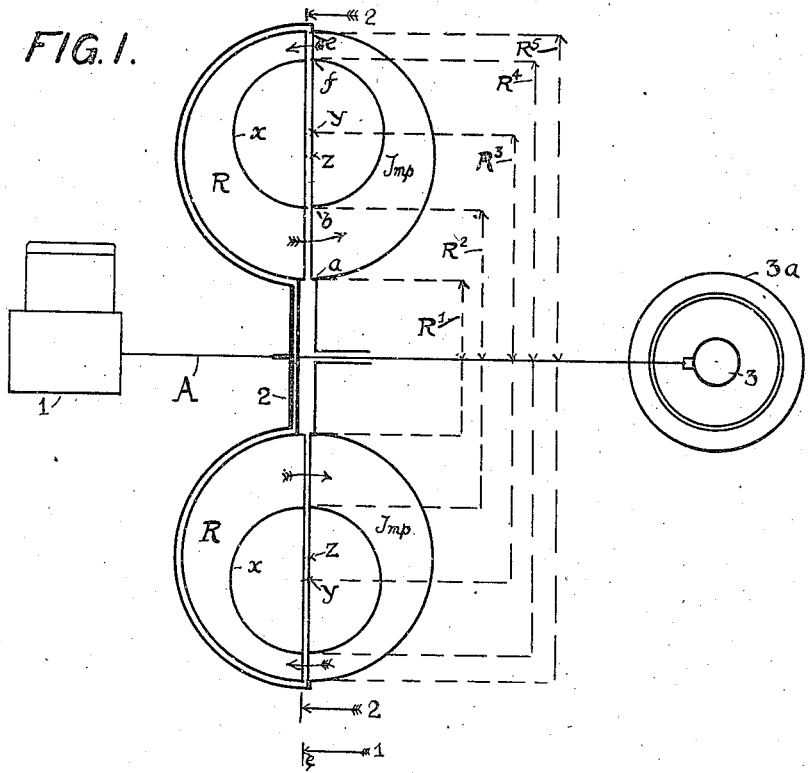
Figure 18:
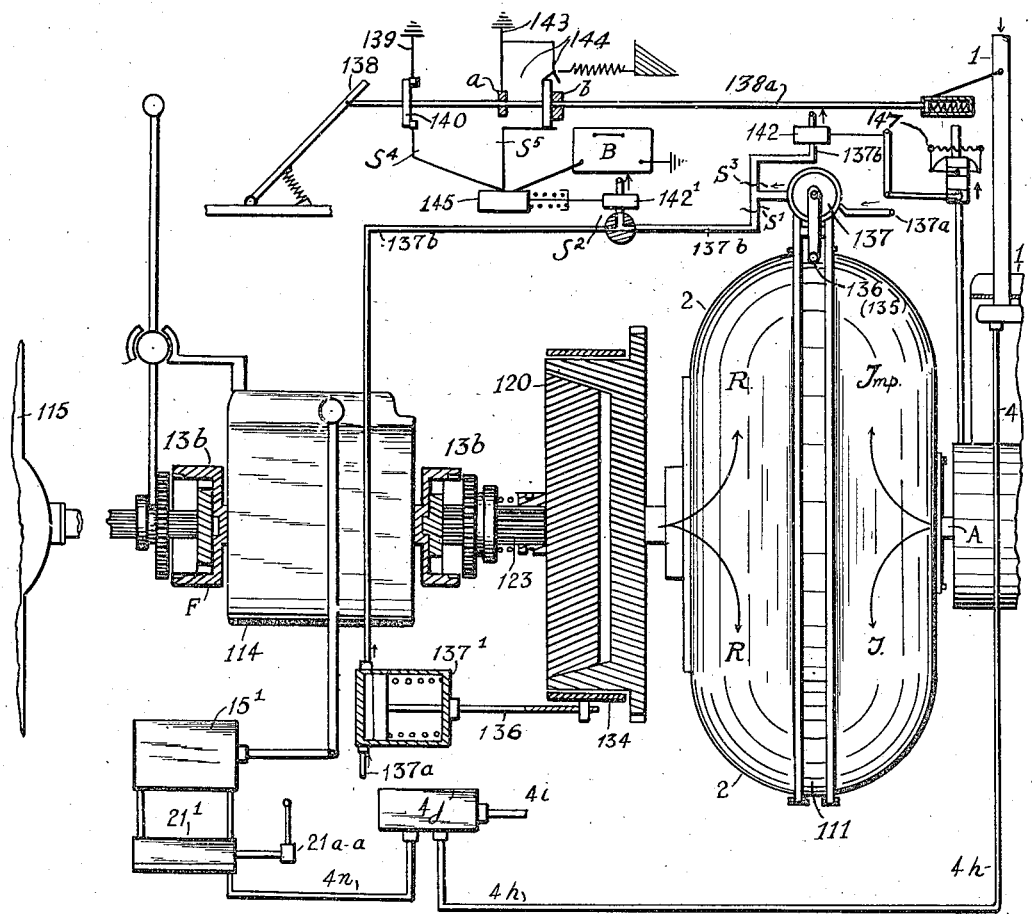

Fig. 18 shows a combination of the Figs. 1, 11 and 15. The brake 134 does not operate on the planetary carrier, but only on the runner of a fluid drive. The brake 135 controls the brake on the idle runner 111 of Fig. 11. The accelerator controls either the brake 134, or the brake 135. The governor controls only the brake 135. The meaning of the separation lines $S^1$, $S^2$, $S^3$ are the same as before.

Figure 13:
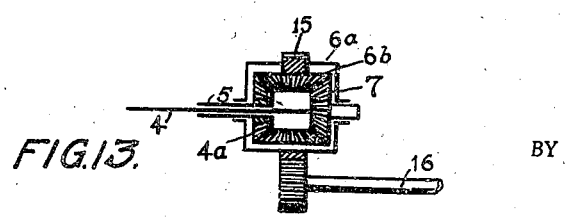
Figure 19:
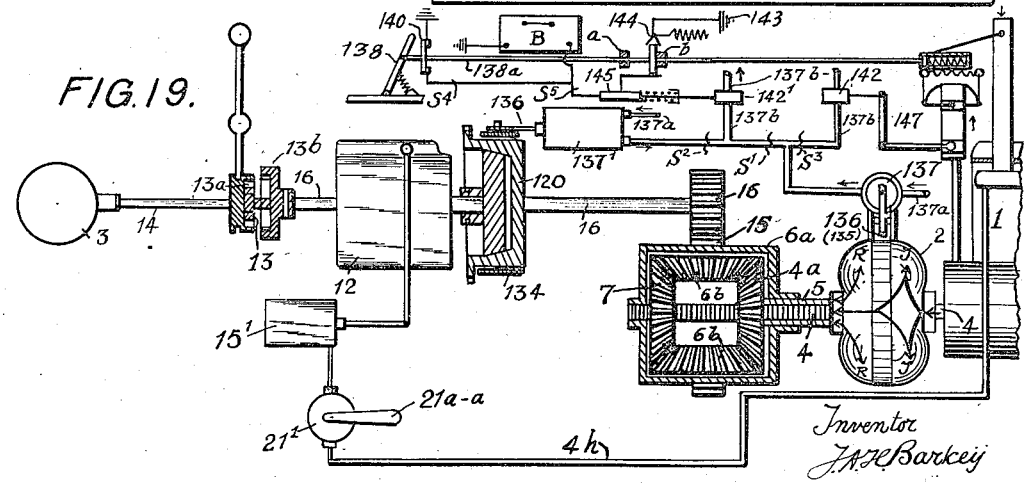

Fig. 19 shows a combination of Figs. 13, 11 and

15. The brake 134 operates or controls again the planetary carrier of a planetary or differential mechanism, but does not operate directly on the runner or impeller of the fluid drive. The accelerator controls either the brake 134 or the brake 135, and the governor controls only the brake 135.

The meaning of the separation lines $S^1$, $S^2$, $S^3$, is the same as for the previous figures.

In the latter four figures, the freewheel 13b can be locked out for reverse drive, as explained in my prior application No. 676,646, June 20, 1933 now Patent No. 2,261,898, independently of the gearshift. And it can be locked out by the gearshift substantially simultaneously with the shift in reverse. The shift may be a handshift or a mechanical shift as explained in said prior patent.

Likewise, the mechanism to lock out the freewheel may lock out the control of the accelerator on the reverse drive (or gearshift as shown in Fig. 15C of Patent No. 2,261,898), because in the combinations of Figs. 16 and 17 it is evident that the momentum of the car, when the freewheel is locked out, would tend to drive the engine in opposite direction so that it would be stalled. These old features are omitted here but it is emphasized that they may be combined with the present construction.

In all figures the two motors 137 and $137^1$, have each their entry line 137a to receive the oil pressure, and I have shown their exit line 137b connected. The separation lines $S^1$, $S^2$, $S^3$, indicate clearly how the valves 142 and $142^1$ can be connected crosswise with either pump.

In Fig. 16 for instance the single separation line $S^1$ indicates that accelerator 138 and valve $142^1$ (controlled thereby) control the pump $137^1$ and the brake 117, and that the governor 147 and valve 142 control the motor 137 and brake 135.

The two separation lines $S^2$ and $S^3$ in combination indicate that accelerator 138 and valve $142^1$ control motor 137 and brake 135.

The two separation lines $S^1$ and $S^2$ in combination indicate that governor 147 and valve 142 control the motor 137 and brake 135. The separation lines $S^1$, $S^2$, $S^3$, in Figs. 17, 18, 19 have the same meaning.

In all Figures 16, 17, 18, 19, if the accelerator 138 and valve $142^1$ control the brake 135 and the idle runner in the fluid drive, this idle runner either serves to slow down the drive shaft extending into the gearbox (or to reverse it even in direction, if preferred) in order to effect a gearshift therein by means of the overrunning action of the freewheel associated therewith, or that this idle runner serves to convert the fluid coupling into a fluid torque converter, depending upon the structure preferred in a given vehicle. These various structures and combinations, will be discussed hereinafter in detail.

Before describing the Figs. 3 to 19 in detail, I prefer to give a little bit of theory on hydraulic mechanism more particularly that of the Foettinger type, shown in the first seven figures, in order to understand better the meaning of the Figures 3 to 13.

Referring more particularly to Fig. 1, in which I have shown diagrammatically a vertical cross section of a Foettinger fluid flywheel.

Figure 2:
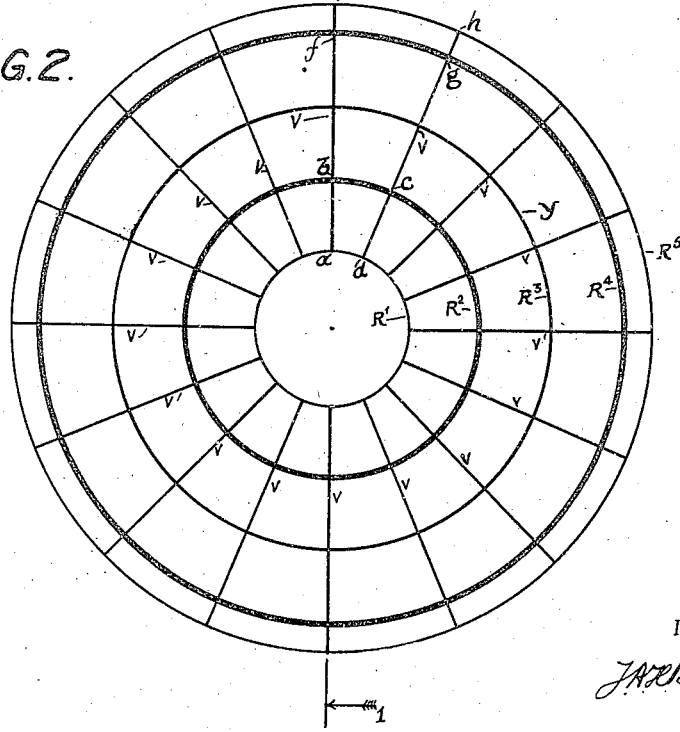

1 is the motor, preferably an internal combustion engine reaching its maximum thermal efficiency in the higher speed ranges. 2 indicates schematically the outer housing connected to the crankshaft of the engine having to the right an impeller with a series of vanes fixed thereon and to the left a runner with a similar number of vanes, as shown in Fig. 2, which represents Fig. 1 on the section line 1—1 thereof. The runner is connected to the driven mechanism 3, here shown as the rear axle of a vehicle, carrying this combination.

In such a coupling the oil rotates with the vanes around the axis of the coupling, which is the straight line A connecting the motor with the rear axle in Fig. 1, but this motion does not transfer practically any power from the impeller to the runner.

The same oil rotates however around the axis of a circle indicated by the letter X, in the direction indicated by the arrows, and this motion of the oil is in fact the power transmitting agent.

The oil entering the impeller at the point $a$ from the runner R has a certain speed depending upon the distance $R^1$, which is the distance from point $a$ to the axis A of the coupling. The oil entering at point $b$ from the runner into the impeller has a kinetic energy proportional to the radius from point $b$ to the axis A of the coupling, which is $R^2$. The total column of oil is thrown by centrifugal force to the periphery of the impeller and leaves the impeller at points $f$ and $e$, which have a radius of respectively $R^4$ and $R^5$ and an inertia corresponding to said radii. (See Fig. 1 mainly.)

Considering Fig. 2, which shows diagrammatically Fig. 1 on the section line 2—2, and shows a plurality of vanes $v$, which may be constructed in various ways. In the present explanation it is convenient to assume that they are arranged radially and are formed by thin separating partitions indicated by the letter $v$. It appears in Fig. 2 that the area of the entry into the impeller of each cell between two separating vanes is $a$—$b$—$c$—$d$, and the area of exit $e$—$f$—$g$—$h$. These two areas have to be made approximately equal and the cells between two adjacent vanes may be further separated by concentric thin walls indicated by two heavy lines extending from $f$ to $g$ and from $b$ to $c$ for one cell. It is evident from the Figure 2 that the separating wall $f$—$g$ has to come closer to the outer periphery of the coupling, than the separating wall $b$—$c$ from the inner periphery thereof. Therefore in Fig. 1 this wall is indicated by the circle X, which is excentric to the circular axis Z around the axis of the coupling as a whole. The axis of the wall X is therefore on the outside thereof and placed for instance at Y. In the following figures the two explained axes Y and Z are placed concentric, because the Figures 3 to 13 show merely the constructional features of the combination of a hydrokinetic torque converter and/or hydrokinetic coupling together with a differential mechanism in various ways, and in certain converters, having a stationary reaction member, the passages between the vanes or channels differ substantially from those in couplings, and in said figures the general arrangements of the parts involved is only of prime importance and not so much the special arrangement on the inside of the hydraulic mechanism, as will be evident later on. Besides in said arrangements of Figs. 8 to 12 one type may be replaced by the other and said Figures 8 to 12 are to a certain extent almost as diagrammatic in their meaning as the first seven figures.

It is evident from Figs. 1 and 2 that the movement of the oil around the circular axis Y (around the axis of the coupling indicated by A in Fig. 1) is the movement, which mainly transfers the flow of power from the impeller to the runner. If we want to transmit a given amount of power and we desire to use a given quantity of oil and certain centrifugal speeds proportional to the maximum speed approximately of the motor, we can compute and we know the different radii indicated and we can compute the all around sizes of the coupling necessary to transmit a given power.

Assuming that the motor starts to rotate and the wheels 3 are stationary the impeller has to reach a certain speed before the oil is capable of moving the runner R connected with the driven mechanism, which offers, of course, an initial inertia. The slip that occurs between the impeller and runner is, when starting of course, terrific and as soon as the runner begins to move, and the driven mechanism is started, the less the slip becomes until impeller and runner have approximately the same speed. In that condition the oil practically has only a uniform motion around the axis A and little around the axis Y, and the only loss is the friction of the oil on the various surfaces in the hydraulic mechanism.

When the impeller and runner run at widely different speeds the oil is rotated fast around the axis Y and is churned at a terrific rate, and the friction and the slip causes a great loss in the transmission of power.

To prevent this loss to a great extent I propose to arrange other mechanism between the impeller and motor to decrease said loss to a minimum and the following diagrammatic figures serve to show the general nature of my invention.

In Fig. 3 the motor is 1, whose crankshaft is connected with a shaft 4 to the outer housing 2 of the hydraulic mechanism. The housing 2 has internal vanes 6, forming the impeller and the runner has vanes indicated by 5, which vanes are connected to the hollow shaft 5, in which rotates the shaft 4 connected to the housing 2. The shaft 5 is connected to a differential housing or planetary carrier 6a, and on said differential housing or carrier are rotatably arranged bevel gears 6b. On this shaft 4 is fixed a differential side gear 4a, geared to said bevel gears 6b. Geared to said level gears 6b is another differential side gear 7 fixed on a shaft 8 leading for instance to the rear axle 3 of a vehicle carrying said combination.

This fundamental arrangment has the advantage over the arrangement of Fig. 1, that the impeller and runner can be made to run at speeds which differ substantially from the relative speeds of the same parts in Fig. 1, which I will explain next.

If shaft 4 rotates at 1000 R. P. M. (motor 1) the gear 4a rotates at the same speed and if shaft 8 does not rotate at all, the housing 6a must rotate at half the speed, if the gears 4a and 7 have the same diameter, assuming that they are shown in the figure.

The vanes 6 will rotate at 1000 R. P. M., the vanes 5 will rotate almost simultaneously therewith at 500 R. P. M. If the kinetic energy of the oil is sufficient to rotate the vanes 5 at 500½ R. P. M., the shaft 8 will make only one revolution, and the vehicle starts rolling. Therefore from that moment up to the moment that shafts 4 and 8 are rotating substantially at the same speed (there is almost always a certain amount of slip) the average difference between the speeds between the impeller and runner will be far less than in the arrangement of Fig. 1. Therefore it does prevent loss of power by friction, and does decrease the amount of eddying between the impeller and runner, and in the dead space between said parts, and between said parts and the outer housing 2.

Therefore the arrangement of Fig. 3 is highly preferable over that of Fig. 1.

Figures 4, 14:
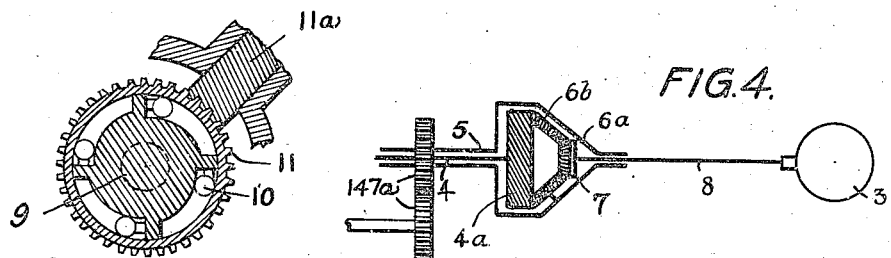
Fig. 14 shows how a pawl 11a can release the freewheel of Fig. 6 for reverse drive.

Fig. 4 shows that in given circumstances of light load it would have an advantage to make the side gears 4a and 7 of different diameter as shown diagrammatically in Fig. 4.

Fig. 5 shows that in given circumstances of a heavy load it would have an advantage to make the side gears 4a and 7 of different diameter in reverse order as that of Fig. 4, as shown diagrammatically in Fig. 5.

Figure 6:
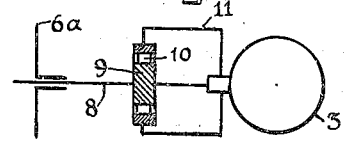

In Fig. 6 is shown a one-way brake 9—10 arranged between the shaft 8 and the stationary part 11, let us say of the housing of the rear axle.

If the load is very heavy the shaft 8 would or might have a tendency to rotate in reverse direction and drive the car backwards. To prevent this, it is advantageous to insert a freewheel with rollers 10 between said shaft 8 and the differential housing 3, to prevent the car from going backwards until the motor is capable to move the driven mechanism in the proper direction. It is understood, that it should be possible to drive the car backwards through the same mechanism with a reverse gear drive as shown in Fig. 7, and the freewheel is so arranged that a pawl 11a, as shown in Fig. 14, operating on the outer element 11 of the freewheel will allow shaft 8 to rotate the inner and outer element of the freewheel in reverse direction.

Another way of preventing this I have shown in Fig. 7, in which I place a gearbox 12 with sliding gears between the differential and the rear axle. However, a sliding gearbox would not do very well if the motor 1 and the rear axle 3 are connected with each other through a hydraulic mechanism without a two-way clutch to separate them. The impeller exerts at all times a reaction on the runner and the runner on the impeller, and to prevent the complication of a two-way clutch, anywhere between motor and rear axle, I prefer to place an overrunning clutch 13 between the gearbox and the rear axle 3.

If the driver closes the throttle with his accelerator, the vehicle (or driven mechanism in general) can overrun the hydraulic mechanism and a standard sliding gear between the shafts 8 and 8a, on either side of the gearbox 12, would allow the shifting mechanism, which may include synchromesh means and power-operated mechanism in that case to operate efficiently and smoothly between said shafts 8 and 8a. (See my Patent No. 2,261,898.)

In trucks the arrangement of Fig. 7 has advantages on hills, where the load becomes too heavy for a Foettinger clutch and the slip increases. Although the arrangement of Figs. 3 to 7 in general would decrease the slip on hills with heavy loads, nevertheless a reduction-gear between the shaft 8 and the rear axle will decrease the slip some more.

In the following Figures 8 to 12 I have shown slightly different arrangements in details, and means showing how to seal the hydraulic mechanism against leakage, and I will describe now said figures in succession and to explain why in these figures no definite hydraulic mechanism should be indicated. In Fig. 8 is shown a hydrokinetic converter, in Fig. 9 a hydrokinetic coupling, and in Figs. 10 and 11 a combination of the two. The position of the circle X as explained in Fig. 1 is kept purposely concentric with Y, but may be shifted in accordance with the general well known characteristics of the Foettinger clutch or converter in general as explained in Figs. 1 and 2. In these figures a two-way clutch is shown, but it is understood of course, that the freewheel arrangement of Fig. 7 may be applied on said modifications in addition to said two-way clutch. This freewheel always allows to brake the driving shaft for a shift in the gearbox.

(It is understood (as shown in Fig. 13) that the three parts of said differential mechanism may be so arranged that the impeller and runner are connected with the side gears by two concentric shafts and that the planetary carrier may be geared to the driven mechanism.)

In Fig. 8, 101 is the prime mover. 102 the crankshaft thereof, 103 the clutch, which connects it with a shaft 104, carrying an intermediate side-gear 105, geared to intermediate (106) pinion gears rotatably arranged on a differential housing 107. Said pinion gears are geared to another intermediate side gear 108 splined on a shaft 113, which is connected to a rotor of a hydrokinetic torque converter. The differential housing or planetary carrier 107 is connected to the other rotor 110 of said hydrokinetic torque converter, 109. Between said two rotors is a torque reaction member 111, which forms a unit with the stationary housing 109 of said torque converter. The shaft 113 may be connected with an intermediate gearbox containing two forward gears, a direct and low gear and eventually a reverse gear, although this is not imperative. The gearbox is in driving arrangement with the differential rear-axle 115 and wheels 116 of a vehicle, preferably by means of a freewheel or overrunning clutch.

Before explaining the mode of operation, I will explain in general the mechanical difference between a hydrokinetic torque-converter and a hydrokinetic coupling. The former is somewhat equivalent to a transformer in the electrical world, and the latter is somewhat equivalent to a mere switch. The former consists of three elements, a runner, a reaction member and an impeller, the latter has only two elements, an impeller and a runner. In both devices the runner and impeller has vanes or cells, directing the fluid (usually light mineral oil in the housing of the coupling) in a circle around the circular axis of the cells of the runner and impeller. This circular axis is in a plane perpendicular to the common longitudinal axis of runner and impeller. Upon rotation the liquid in the coupling is subjected to a dual motion. One motion is a tendency of the fluid in the cells of runner and impeller to merely rotate in a circle around the common axis of the two rotors, when they both rotate in the same direction. The other motion is a tendency of the fluid to rotate around the circular axis of the two rotors as indicated by the arrows in Figs. 8 and 9.

In Fig. 8, when the motor rotates (let us say clockwise) the driving gear 105, the fluid in the converter tends to rotate immediately both rotors 112 and 110 in the same direction. If the shaft 113 offers considerable resistance, the housing 107 is rotated at half engine speed when the shaft 113 is standing still. As soon as the shaft 113 rotates the least little bit, the housing 107 will rotate at slightly more than half the speed of the shaft 104. When the shaft 113 rotates slowly there is, of course, a great slip between impeller 110 and runner 112, but in this type of torque converter said slip is not a total loss at all, because it converts the relative great rotation of the impeller 110 into a great force at slow rotative speed on the shaft 113 to drive the car.

A gear reduction as shown at 114 may be placed between the torque converter and the rear axle 115 to reduce the resistance so that shaft 113 may pick up speed readily and so that shaft 113 rotates quickly with the same speed as shaft 104. The reaction member does not cause any more slip than that of an ordinary hydrokinetic coupling, except for the slight increase of friction caused by the vanes or cells of the reaction member in addition to the friction of the liquid in the two rotors. Therefore unless the vehicle is standing on a very steep grade and starts rolling backwards, there is not the slightest tendency to drive the car backwards. As a third safeguard and to insure the possibility of a positive drive for emergency cases, I apply a brake 117 on the differential housing 107. This brake when applied holds the differential housing or planetary gearing stationary and also the rotor 110, splined to the differential housing 107. In that case the car is driven backwards to get out of a sudden abnormal resistance at a reduced gear-reduction of the gearbox 114. The rotor 112 operates as an impeller against the stationary rotor 110 and a complete slip has to take place, because rotor 110 is held stationary by the brake 117. In so far as the distance driven backwards is negligible in the ordinary use of a car, this appreciable loss is practically reduced to a negligible loss. Besides, by using brake 117 we do not need to apply a reverse gear in the gearbox at all, because for parking purposes, and said emergency cases, we can apply the brake 117 by hand or foot as desired.

If a reverse drive is incorporated in the gearbox 114, the brake 117 becomes largely superfluous. In either case the freewheel shown must be eliminated, see Figs. 16 etc.

Another modification of a gear drive resembling that of Fig. 8, I have shown in Fig. 9.

The prime mover 118 has a crankshaft 119 connected by a two-way clutch 120 to a shaft 121, splined to a hydrokinetic coupling, 122, although here, as in the modification of Fig. 8, a hydrokinetic torque converter of the design of Fig. 5 could be equally used, if desired. The impeller 122a, forms a torque tube for the shaft 121, and is connected to a side-gear 129 in a differential gearing. The runner 123 is connected to a disc with a gear 124, geared to the gears 125, rotatably arranged on a stationary member 126 in the present construction, and these latter gears are geared to a gear 127 forming one part with the differential housing or planetary carrier 128, on which are rotatably arranged the intermediate pinion gears 130, which are geared to the intermediate side gear 131, on the driven shaft 132 connected eventually by gear reduction, as in Fig. 8, to the rear axle 133 of the vehicle. A hand or foot brake 134 may be again applied on the differential housing. Or a power brake as shown in Fig. 17.

The operation of this device is somewhat different from that of Fig. 8. When the motor rotates the impeller 122a, it immediately tends to rotate the runner 123 in the same direction, so that the driving gear 129 and the planetary gears 130 form a unit tending to rotate at the same speed in the same direction. The reaction, however, of the shaft 132 and gear 131, geared to the pinion gears 130, tends immediately to retard the runner 123. Here, as in Fig. 6, if the rotor 123 rotates at half the speed of the impeller 122 the motor has a tendency to drive the car backwards. However, the low gear which may be applied between rear axle 133 and shaft 132 prevents such tendency positively, except in extreme emergency cases. In said cases the brake 134 should be applied and the car freed from the emergency by the positive gear drive obtained thereby, as explained for Fig. 8.

It is understood that a hydrokinetic torque converter may be substituted for the hydrokinetic coupling shown, if in certain designs the tendency to a backward drive has to be diminished f. i. for standard use as in trucks.

The application of the overdrive 124 to 127 has the advantage that fuel economy can be attained under favorable driving conditions down grade and with the wind. If the resistance is small, the runner 123 will rotate substantially at the same speed as the impeller minus the slip, but the overdrive 124—127 rotates the housing 128 faster than the shaft 121, and therefore the shaft 132 may rotate at a higher speed than the shaft 121. If the resistance is great the slip increases up to the point where shaft 132 still rotates as fast as shaft 121. If the resistance becomes still greater, the slip increases still further, and in such cases either a gear-reduction of a gearbox 14 should be used, or a hydrokinetic torque converter. The gearbox may use sliding gears, because it is preferred to use a two-way clutch between prime mover and coupling or differential or planetary gear set.

Cross combinations of this gear drive as shown in Figs. 8 and 9 are further defined in the appended claims, and it is supposed that the application of planetary gearing and of the two-way clutch for the sliding gear and clutch, is included therein.

It is also understood that it would not involve invention to place the two-way clutch 103 in Fig. 8 between the hydrokinetic torque converter 112 and the gear box 114, if a sliding gear is preferred.

Likewise in Fig. 9, it would not be invention to place the two-way clutch 120 between the differential gearing 131 and the overdrive 124 to 126, or between this overdrive and the hydrokinetic coupling 122.

Nor would it be invention over the arrangement shown in Fig. 9 to place a freewheel *f* behind the gearbox to facilitate the gear-shift for a sliding gear and to omit the two-way clutch in either arrangement of Fig. 8 or Fig. 9. Or to add a freewheel between the rear-axle and the gearbox in the arrangements as they are shown in Fig. 8 and Fig. 9. All such modifications can be combined with the fundamental arrangement shown.

The latter modification of the freewheel behind the gearbox I have shown already in my Patent No. 2,261,898. The two Figures 10 and 11 show a combination of the Figs. 8 and 9 and show a new arrangement to convert a converter into a fluid coupling and a fluid coupling into a converter, during the rotation thereof.

In Fig. 10 I have shown in vertical cross section a torque converter which may be reduced to a fluid coupling by the driver during the operation thereof. The reaction member 111 of Fig. 8 I have arranged within the stationary member 109, so that a brake band 135 can be operated from a stationary point over the reaction member 111 so that the device becomes a hydrokinetic converter if the brake is applied and a hydrokinetic coupling if the brake is released. In the latter case the member 111 loses its character as a reaction member and is able to rotate freely so that the device becomes a mere fluid coupling, the member 111 rotating virtually at the same speed as the impeller.

The brake band is contracted by a fluid motor 137, which is under control of the driver. In the present arrangement it is preferred to control the member 111 through the fuel control element or accelerator 138. In my arrangement of Figs. 10 and 11 I prefer not to connect the reaction member 111 with the runner, but to let the guide blades of member 111 rotate free of the runner and free of the impeller.

I only show the preferred arrangement in Fig. 11. The hydraulic servo-motor receives its pressure at 137a from any source of oil-pressure, for instance the lubrication system of the internal combustion engine using the present device. A pipe 137b leads to a valve 142 to release the pressure coming from 137a in the motor 137. The valve is controlled by two solenoids as desired.

The solenoid 145 actuating the valve 142 is in an electrical circuit 143, leading to a switch 144 actuated by the accelerator only when it is pressed beyond its maximum throttle opening. This switch 144 closes then the circuit for energising of the solenoid 145, which opens the valve 142. The pressure is released in the motor 137 and the brake 135 is released and the torque converter becomes a hydrokinetic coupling. If the driver wants to de-energise the solenoid he has to bring the accelerator back to the idling position. To avoid the de-energising of the solenoid 145 at speeds less than maximum throttle opening, it is preferred to use a second circuit 139 and a second solenoid 141, and second switch 140, for the second circuit to close the valve 142. If the accelerator is brought back to idling position, as shown, the circuit 139 is closed and the valve 142 is closed, the pressure at 137a actuates the motor 137 again, the brake 135 is contracted and the device operates as a torque converter, at all throttle openings inclusive maximum. This arrangement allows the operator to have the greatest possible acceleration without loss of efficiency through slip, under any road condition. When the car is running at fairly high speed it has an advantage to let the device act as a fluid coupling, decreasing the friction of the oil and eliminating the resistance in the oil-circulation pressure to the motor 137.

It is understood that a number of such reaction members 111 could be placed in series and stopped or released in accordance to conditions at the option of the driver through the position of his accelerator 138.

Fig. 12 shows a modification of the control of the device by a single solenoid. The rod 138a of the accelerator 138 has two stops on it *a* and *b* apart about the distance the accelerator moves from idling position (in which the accelerator 138 is shown) and the maximum gas position. When pressing on the accelerator the solenoid 145 is not energised and the spring 145a places the valve 142 in open position so that the pressure in motor 137 is released. When it is desired to convert the fluid coupling into a torque converter, all the driver has to do is to step on the gas beyond maximum position so that the switch 144 closes the circuit 143 to energise the solenoid. The valve 142 is then closed, the brake applied on the reaction member 111 and the device is a torque converter. When the driver desires to use the device as a fluid coupling, he merely releases suddenly the accelerator so that the stop $a$ releases, or recedes from, the switch. The switch is caught by any well known ratchet device, so that if the accelerator recedes, the arm 138a moves through a hole in the switch arm until the stop $b$ comes into action releasing the arm from the switch and thereby de-energising the solenoid so that the spring 145a opens the valve 142 releasing the pressure in motor 137 so that the brake is released and the device acts as a fluid coupling. When the driver steps on the gas, inclusive maximum position, the device continues to act as a fluid coupling until again the accelerator is pressed down beyond maximum position, in which it becomes a torque converter until the accelerator is released again to idling position.

It is understood that the valve 142 could be opened and closed by a centrifugal governor 147, as shown in Fig. 15. On a driven shaft geared either to shaft 4 of Fig. 3, shaft 5 of Fig. 4, or shaft 8 of Fig. 5 by means of gearing 147a and so that when the vehicle is going at a fairly high speed (let us say any speed above 30, 35, or 40 miles an hour) the valve 142 is opened and the brake released so that the device operates as a fluid coupling. At such speeds the resistance cannot be very great and the torque converter characteristics can be released as superfluous to drive the car. The torque converter is only needed if the motor meets a great resistance at a slow speed of the vehicle.

Fig. 16 is, as stated before, a combination of Fig. 8, with Fig. 11 or Fig. 15. The accelerator 138 controls the switch 140, which controls the solenoid 141, which controls the valve 142, which controls the pump 137, which controls the brake 117, which brakes the impeller 110 of the fluid drive 109, as already described in connection with Fig. 8. Runner 112 is connected to shaft 113, which is connected with gearbox 114.

The operation of this combination is as follows. In retracted position of the accelerator 138, the brake 117 is applied, the differential gears 106 are slowed up, or held stationary with the result that the shaft 113, connected with the runner 112, rotates in a direction opposite to that of the engine, due to the action of the freewheel 13b. Thereafter a gearshift can be made whether the car is moving or standing still. Of course, when the car is moving relatively faster than the motor at any given gear drive, the application of the brake 117 is largely superfluous on account of overrunning action of the freewheel, but if the car is standing still or moving relatively slower, it is not. In the latter case a gearshift can be made without declutching a two-way clutch, and the well-known creeping action of the fluid drive is at the same time eliminated.

If the freewheel is locked out or will be locked out for reverse drive or for braking purposes in forwards gear drives, the control of the accelerator 138 on the brake 117 has to be eliminated, otherwise the momentum of the car would tend ultimately to rotate the engine in reverse direction and stall it. Such an arrangement to lock out the control of the accelerator on the gearshift when locking out the freewheel, I have shown already in my prior Patent No. 2,261,898. The same arrangement is applied here where the accelerator controls the application of the brake 134.

To decrease the complication of such a brake, I proposed as an alternative, to control a brake 135 on an idle runner 111, between the impeller and runner, having blades in such a direction that the impeller tends to rotate the runner slightly in reverse direction, so that a similar gearshift can be made at all speeds, and even when the car is standing still, and doing away with the planetary gearing.

The further advantage is that when the freewheel is locked out, the momentum of the car does not reverse the rotation of the engine, but the friction of the motor will brake the car as in any standard fluid drive.

The valve 142 is then connected not with the motor $137^1$, operating the brake 117, but with the motor 137, operating the brake 135 on the idle runner 111, as described in connection with Fig. 11.

A third variation is that a governor 147 may control the motor 137 for the brake 135, but in that case the idle runner has the function of converting a fluid drive into a fluid torque converter. At predetermined speeds it is preferred to transmit the power of the engine at different rates of speeds between impeller and runner.

The fourth variation is, that the accelerator 138 may control again such an idle runner, so that the characteristics of the torque converter are available at any speed subject to the will of the driver. In the following four Figures 16 to 19, the accelerator 138 controls when released the operation of the solenoid 145 and thereby the operation of motor 137 on brake 135. This happens when the idle runner is so constructed that it causes a slight backwards rotation of the runner connected to the driven mechanism.

If said idle runner is so constructed as to change the fluid coupling into a fluid converter, as described before in relation to Figs. 11 and 12, the accelerator 138 closes the circuit for a solenoid 145 through a switch 144, and actuates valve 142 to close the passage for the fluid from motor 137 to apply a brake on said idle runner 111, now a re-action member, when said accelerator 138 is pressed beyond wide open position, and to open said passage when released.

I prefer to have this greater torque available when the throttle is pushed beyond wide open position, but in certain cases it would have an advantage to reverse this, so that the brake 135 on the re-action member would be taken off when the accelerator is pushed beyond the wide open position, and applied when released. This can be merely reversed for instance by placing the passage in valve 142 in a corresponding position so that the passage for fluid would be closed when the accelerator 138 is released and the brake applied, and said passage opened when the accelerator is pushed beyond wide open position. This reversal can be effected in other ways if so desired.

I have shown in the drawings of the two electrical circuits, two cutting lines $S^4$ and $S^5$ for the switch. These cutting lines mean merely that if one circuit is cut said idle runner is used as a means to start a backwards rotation of the driven shaft or runner, and if the other circuit is cut the fluid coupling is converted into a torque converter in two ways, as described. Either one or the other system is applied in a power transmission. However, it would be possible to apply both systems.

It is understood that said cutting lines $S^4$ and $S^5$ may merely indicate a switch on the dashboard for both circuits, and that two runners are incorporated to cause either one of said effects. If the switch cuts one circuit for one runner, the accelerator will only operate the circuit to cause the other circuit to operate for the other runner, by the movement of the accelerator.

It is further understood that any obvious modifications whereby the same effects can be obtained would fall within the scope of this invention and its claims.

As it would be too cumbersome to show these four variations in different drawings, I have shown in Fig. 16, four dividing lines, indicated by the letter $s$, so that the valve $142^1$ controlled by the accelerator 138 may control either the motor $137^1$, operating the brake 117, or the motor 137, operating the brake 135. Or the valve 142, controlled by the centrifugal governor 142 may control either motor $137^1$ or 137. However, only the control of the brake 135, when the idle runner 111 may convert the fluid drive into a fluid torque converter, is preferably subject to the centrifugal governor. The accelerator 138 of course, may control the brake 135, when the idle runner is constructed so as to effect a slight reverse rotation of the runner, or when the idle runner is constructed as a means to convert a fluid drive into a fluid torque converter.

In Fig. 17, substantially the same variations can be obtained. Here, however, the brake 134 operates not on the impeller, as in Fig. 16, but on the runner. As described before, an overdrive is inserted between the runner of the fluid drive and the differential mechanism.

The accelerator 138, here controls again either the motor $137^1$ braking the differential housing or planetary carrier, or it controls the motor 137 braking an idle runner, serving either as means to effect a slight reverse rotation, or serving as a means to create a torque converter.

The governor 147 controls again preferably only the motor 137 for said two purposes.

Fig. 18 shows, however, an absence of the differential mechanism, but the similar four variations described can be used in the same way. The brake 134 stops the runner due to the freewheel 13b before or behind the gearbox.

When the freewheel is locked out, it cuts out the brake and the momentum of the car, however cannot reverse the rotation of the motor because the differential mechanism is omitted. When the runner is stopped by the brake 134 and the accelerator 138, when the freewheel is not locked out, it may slightly impede the rotation of the impeller and engine but not sufficiently to stop the motor or stall it.

Of course, the infinitely variable geardrive obtained by using a differential mechanism is lost here.

In all four combinations, when the freewheel is locked out, the brake on the planetary carrier or driven shaft is cut out from under the control of the accelerator, otherwise the release of the accelerator would stop and brake the car in ordinary forward driving.

In all four combinations shown in Figs. 16 to 19, I prefer to use a freewheel either behind, or in front of the gearbox to effect an easy shift at all times (car moving or standing still).

In all four combinations, I use a disengageable two-way clutch anywhere to effect a gearshift in reverse and when the freewheel is locked out. In reverse it must be locked out, and as explained before, when shifting into reverse, the freewheel is locked out, substantially simultaneously therewith.

In all four combinations, the cutting off of the fuel or the cutting of the ignition, automatically causes a disengagement of the fluid drive, which effects the overrunning action of the freewheel allowing a manual or power shift.

Likewise here, in Fig. 18, as in Figs. 16 and 17, the idle runner 111 may act as a torque converter, controlled either by the accelerator 138 or by the centrifugal governor 147. In so far as the differential mechanism is missing here, the torque converter may be assisted by the various gears of a gearbox, together with a freewheel, to facilitate shifting without de-clutching the two-way clutch 120.

If the freewheel is locked out (front or rear one) the switch 140 may again be locked out, but the momentum or kinetic energy of the car does not stop the motor, and if the freewheel is not locked out the impeller connected with the motor may idle conveniently against the runner, held stationary by the brake 134. Therefore the locking out of the accelerator 138 and switch 140 is in this arrangement not imperative, when the car is standing still.

The last modification of Fig. 19, combines the Fig. 13 with Fig. 11 or Fig. 15. The engine 1 is connected to an impeller and to a gear 7 in the differential housing 6a. The shaft 4 runs in the hollow shaft 5, connected to the right with the runner, and to the left with the gear 4a. The gears 7 and 4a are geared to the gears 6b, rotatably arranged on the differential housing 6a, carrying a gear 15, geared in overdrive to a gear 16, connected to a clutch 120, gearbox 12, freewheel 13b, and wheels 3 of a vehicle.

Likewise here, when releasing the accelerator, switch 140 is closed, solenoid 145 and valve $142^1$ and motor $137^1$, actuated, brake 134 applied. The differential housing is stopped, and the gears 7 and 4a, respectively impeller and runner, are rotated in opposite direction. The engine is retarded, but not stopped, gearshift can be made on account of freewheel 13b.

If freewheel 13b is locked out, the accelerator control on the brake 134, should be locked out, (as shown in Fig. 15C of application 676,646).

The other modification is again that the accelerator 138, or the governor 147, controls a valve $142^1$ and motor 137, controlling respectively either an idle runner 111 to effect a gearshift by means of freewheel 13b, or an idle runner acting as a torque converter. The torque converter may be either controlled by the accelerator, or by the governor, but the idle runner 111 to get a reverse rotation, of course, preferably only by the accelerator.

The separating lines $s$ make it obvious that the control of the accelerator 138, or of the governor 147, can be switched over from motor $137^1$ to motor 137, or reversely, depending which construction is preferred for any given design of power transmission in which a sliding gearbox is involved, without the disengagement of a two-way clutch in addition to the release of the accelerator.

It is understood, that the various drives may use a gearbox between the planetary gearing and the axle of a vehicle or not.

It is understood that in the mechanism whereby the lock-out of the freewheel is combined with the lock-out of the electrical means associated with the accelerator to control a brake on the runner, driven gear or planetary carrier, the lock-out of the electrical means takes place slightly before the lock-out of the freewheel.

In the following claims this is broadly stated and included by the term "substantially simultaneously therewith."

In so far as the idle runner in Figs. 16 to 19 may be controlled by a brake under control of the accelerator, and said idle runner may be either for the purpose of effecting a reverse rotation of the driven shaft or the conversion of the fluid drive or coupling into a torque converter, the control of the accelerator is shown the same for both types, but it is understood that for the latter conversion this control is preferably of the type of Figs. 11 and 12. That means it is operated when the accelerator is pushed beyond wide open throttle.

It would be too great a complication to show these two variations in another set of drawings similar to Figs. 16 to 19, and showing the control of this idle runner or reaction member in the specific way it is shown in Figs. 11 and 12. In the following claims the expression "under control of said accelerator" includes therefore the specific variety shown in Figs. 11 and 12.

It is understood that any combination of the controlling means shown in Figs. 16 to 19 under control of the accelerator, and control of the centrifugal governor may be combined in one structure as shown in Fig. 18, or as shown in Figs. 16, 17, 19 combined with the planetary gearing, and that any of said combinations may be combined with the freewheel as shown in Fig. 6, or in Fig. 7.

It is further understood that if the accelerator controls electrical means controlling a source of power to apply a brake 135 on an idle runner, which causes a slight reverse rotation tendency on the runner connected with the driven mechanism, that the means of interrupting the circuit of said electrical means when the freewheel is locked out by the separate shift lever (see Fig. 15C of Patent No. 2,261,898) are superfluous. If the car comes to a stop when the accelerator is released and the freewheel locked out, the slight tendency of the runner to run in reverse direction, due to the angle of the blades in the idle runner brought to a stop by the release of the accelerator, is not enough to start the car rolling backwards. At least not on level ground.

Therefore it would not be invention to combine the brake system of Fig. 11 (a brake on the planetary carrier) with the said type of idle runner, because on a slant backwards the brake 135 could be applied by power or foot (optionally) when the freewheel of Fig. 14 is locked in and the hydraulic transmission could not drive the car backwards.

It is therefore understood that the freewheel lock-out of Fig. 14 to prevent reverse drive must be eliminated when positive mechanical reverse drive is established either in the gearbox or the planetary transmission.

For the reason that the control of the idle runner by a brake 135 should be related to the lock out of the freewheel in the case the idle runner is braked for torque conversion, and should preferably not be related in the case an idle runner is braked for reverse rotation of the runner, the elimination of the control of the electrical means to control the brake on the idle runner when the freewheel is locked out, is not shown in the Figures 16, 17, 18, 19, and the relative claims are based on the description in combination of what is shown.

(It would be superfluous to show two sets of drawings for these two cases instead of describing these two cases, and basing the differentiation in claims on the figures plus the description.)

When in the latter case, the freewheel is locked out, the driven mechanism, especially in the case of a car, would tend also reversely to drive the impeller in opposite or reverse directions, but this tendency even if the speed of the car is high, can be made so small that it will not kill the engine, even when idling or slightly more than idling. Therefore the elimination of control of the accelerator would be largely superfluous, or the elimination of said control could be made optionally by means of a control button from the dash. It is understood that any other motor may be substituted for the hydraulic motor 137, and valve 142 shown. It may be a pneumatic or vacuum motor, as shown in my Patent 2,261,898, and the valve 142 would control the admission of atmospheric pressure to a vacuum chamber to release a brake under control of the accelerator 138. In my following application No. 399,556, of June 13, 1941, I show a modified improvement whereby this brake is only eliminated when the higher speed ranges are in operation. And it is also understood that the two-way clutch 120 may be operated by a pneumatic motor, as shown in said Patent No. 2,261,898.

It is further understood that the brake applicable on the idle runner between impeller and runner in the Figures 16, 17, 19 would create a condition similar to that shown in Fig. 8, in which this runner is held constantly or continuously in a stationary position. In this position it is capable of rotating the planetary carrier 107 connected to the vane member 110 at a higher speed than the shaft 104 and gear 105, connected to the prime mover. If the runner or vane member 112 rotates faster than vane member 110 under a decreasing torque, the member 112 becomes the impeller and the member 110 the runner. An overdrive is established.

If this idle runner is freely rotating, as shown in the Figures 16, 17, 19, it may create this overdrive relation already without being stopped.

It is understood that the idle runner, wherever placed and in which form, always is located between impeller and runner (pump wheel and turbine wheel). It does matter, however, whether this vane member is connected with the planetary gearing or not. If stopped it has a tendency in all constructions to increase the torque, especially in those incorporating the planetary gearing.

The advantage of the construction of Fig. 8 is further that the impeller is rotated from standing start at a speed which is less than that of the prime mover, so that a creeping tendency of the car can be eliminated.

If the planetary carrier rotates at half engine speed the impeller exerts only one quarter of the driving power of the prime mover to the driven mechanism, because the transmitted hydraulic power increases with the square of the speed of the pump wheel, or impeller. If the runner 111 of Fig. 8 can be idle, but can also be braked as shown in Fig. 16, an advantage is obtained over the construction of Fig. 8.

It is further understood that the arrangement of Figs. 11 and 12 whereby the idle runner is braked when the accelerator is pushed beyond wide open throttle may be reversed, so that the brake on the idle runner in the Figures 16 to 19 is applied when the accelerator is released, and the brake released when the accelerator is pushed beyond the wide open position of the throttle. This choice depends upon design. If one desires a great torque for starting, the brake should be applied on the idle runner to provide greater torque, and when the car has reached sufficient speed, eventually through a series of gearshifts as explained, the driver can push the accelerator way down and the torque converter becomes a slip coupling. If the driver approaches a steep hill, however, he has to release the throttle momentarily to go back to the torque converter condition.

This being merely a choice of construction, the following claims include both modifications, by merely stating that the accelerator controls the brake on the idle runner.

I claim:

1. In a vehicle the combination of an internal combustion engine connected by means of a two-way clutch to a driving shaft, a hydrokinetic coupling including a runner on said shaft and said shaft extending through said coupling and through the runner of said hydrokinetic coupling, said shaft connected to an intermediate sidegear in a differential gearset, said runner connected to the housing of said differential gear set by means of an intermediate overdrive between said runner and said differential housing, said side gear geared to intermediate pinion gears rotatably arranged on said differential housing, said pinion gears driving another side-gear on a propeller shaft connected with the wheels of said vehicle.

2. A prime mover, having an accelerator connected to a differential mechanism, including a housing, a fluid drive including an impeller and runner, one gear of said mechanism connected to the engine, and another gear thereof connected to the runner of the fluid drive, said gears geared to gears rotatably arranged on a differential housing, connected to the impeller of said fluid drive, said runner connected to a gearbox, a freewheel behind said gearbox, a brake operable on said differential housing to stop said housing and to effect operation of said freewheel, said brake being power operated and controlled by the accelerator of said prime mover.

3. The combination of claim 2, in which said brake is applied when said accelerator is released substantially to idling position, effecting thereby the operation of freewheel and of said brake.

4. The combination of claim 2, in which said fluid drive is provided with a brake for said runner, said brake being applied when said accelerator is moved to substantially idling position, means to lock out said freewheel, simultaneously locking out the operation of said brake.

5. An internal combustion engine controlled by an accelerator, in combination with a fluid drive, said fluid drive having an impeller and a runner which is associated with a gearbox and a freewheel behind said gearbox, said freewheel connected with the wheels of a vehicle carrying said combination, a brake operating on the runner of said fluid drive so as to retard the rotation of gears in said gearbox in relation with the speed of said vehicle so that said freewheel is placed in operation and so that a gearshift may be effected in said gearbox, said brake associated with a source of power controlled by the accelerator of the engine, said source applying said brake when the accelerator is reduced substantially to idling position.

6. An internal combustion engine controlled by an accelerator in combination with a fluid drive, a gearbox and a freewheel, connected to the wheels of a vehicle carrying said combination, said fluid drive having an impeller and a runner which is under control of a brake, a source of power for said brake, said source under control of the accelerator, so that upon application of said brake said freewheel may be placed in overrunning condition allowing a gearshift in said gearbox, even if said vehicle is standing still.

7. An internal combustion engine in combination with a fluid drive comprising an impeller and a runner which is connected to a gearbox, said gearbox in driving relation with the wheels of a vehicle by means of a freewheel, an accelerator controlling said engine, said accelerator controlling means which operate a brake which effects the retardation of the speed of rotation of the gears in the gearbox, so that upon release of said accelerator, said freewheel is placed in overrunning condition allowing thereby a gearshift in said gearbox even if the vehicle is standing still.

8. The combination of a prime mover and accelerator with a fluid drive, a two-way-clutch and gear transmission connected by means of a freewheel to a driven mechanism, said clutch and freewheel being operatively independent of each other in this sense that engagement or disengagement of said clutch does not affect the freewheeling action, said fluid drive comprising an impeller and a runner, said runner connected with said transmission, a brake on said runner, means to control said brake, said means being under control of said accelerator.

9. The combination of claim 8, in combination with means to lock out said freewheel, when shifting into reverse.

10. The combination of a prime mover and accelerator with a fluid drive, a two-way clutch and gear-transmission connected by means of a freewheel to a driven mechanism, the fluid drive comprising an impeller and runner and a reaction member between the two, said fluid drive runner connected to said driven mechanism by means of a shaft, a brake on said reaction member, means to control said brake, said means under control of said accelerator.

11. The combination of claim 10, in combination with means to lock out said freewheel, when shifting into reverse.

12. The combination of a prime mover with a fluid drive, comprising an impeller and a runner and a reaction member between the two, a brake for said reaction member, said fluid drive runner connected to a driven mechanism by means of a shaft, a centrifugal governor driven by said prime mover and adapted by electrical means to release said brake on said reaction member, when said prime mover reaches a definite high speed, and to apply said brake when a definite slower speed has been reached by said prime mover.

13. The combination of a prime mover with a fluid drive, comprising an impeller connected to said prime mover and a runner connected to a driven mechanism, a reaction member in operative association with said impeller and runner, a brake for said reaction member, a source of power to actuate said brake, electrical means to control said source, and said electrical means being controlled by a centrifugal governor associated with said mechanism and operating said brake at predetermined speeds.

14. The combination of a prime mover and accelerator with a fluid drive, comprising an impeller and a runner in driving relation with two members of a planetary gearing respectively a driving member and a driven member, and the third member being in driving relation with a driven mechanism, a brake on the planetary carrier of said gearing, said brake operated by a source of power, said source controlled by electrical means, and said electrical means under control of the said accelerator.

15. The combination of claim 14 in combination with a freewheel and gear transmission between said third member of said planetary gearing and said driven mechanism, means to lock out said freewheel, when shifting into reverse.

16. The combination of claim 14 in combination with a reaction-member between said impeller and runner, a brake for said re-action member, said brake under control of electrical means, said electrical means under control of said accelerator.

17. The combination of claim 14 in combination with a reaction member between said impeller and runner, a brake for said re-action member, said brake under control of electrical means, said electrical means under control of a centrifugal governor associated with said combination.

18. The combination of claim 14 in combination with an idle runner between said impeller and runner, said idle runner when stopped tending to drive said runner in reverse direction, a freewheel and gear transmission between said planetary gearing and driven mechanism, a brake for said idle runner, electrical means operating said brake, said electrical means under control of said accelerator.

19. The combination of an internal combustion engine, accelerator, fluid drive comprising an impeller and runner, and friction clutch and a sliding gear transmission beyond said clutch, said transmission including at least two speeds forward and a reverse gear drive, an overrunning clutch between said transmission and a driven mechanism, means to lock out said overrunning clutch simultaneously with a shift of shifting means in said transmission into reverse, a brake mechanism on said runner, said brake mechanism adapted to be applied when said accelerator is pushed beyond wide open position, and released when said accelerator is released to idling position, said brake being independent of any mechanism operating said friction clutch between engine and transmission.

20. The combination of claim 19, in combination with an idle runner between said impeller and runner of said fluid drive, power means to operate a brake for said idle runner, said runner when braked effecting a slight reverse rotation of said runner, electrical means to operate said power means, said electrical means under control of said accelerator.

21. The combination of claim 19, in combination with a re-action member between said impeller and runner of said fluid drive, power means to operate a brake on said re-action member, means to control said power means for said brake, said latter means under control of said accelerator.

22. The combination of an internal combustion engine and accelerator with a fluid drive, comprising an impeller and runner, and a driven mechanism, a reaction member between said impeller and runner, power means to operate a brake on said reaction member, means to control said power means, said latter means under control of said accelerator in such a way that said brake is released when said accelerator is pressed beyond wide open position, and said brake applied when said accelerator is released to idling position.

23. The combination of claim 22, in combination with controlling means for said power means under control of a centrifugal governor, said governor associated with said engine.

24. The combination of claim 22, in combination with electrical means for control of said power means, said electrical means under control of said accelerator.

25. The combination of claim 22, in combination with electrical means partly under control of said accelerator and partly under control of a centrifugal governor associated with said combination, said electrical means controlling the power means for said brake on said re-action member.

26. The combination of a prime mover and accelerator with a fluid drive between said prime mover and a driven mechanism, said fluid drive comprising an impeller connected to said prime mover and a runner connected to said driven mechanism, an idle runner in said fluid drive in operative association with said impeller and runner, a brake on said idle runner, power means to apply said brake, said power means under control of the accelerator in such a way that said brake is applied when said accelerator is pressed beyond wide open position, and released when said accelerator is released.

27. The combination of claim 26 in combination with a gear transmission between said runner and said driven mechanism and a freewheel between said transmission and said driven mechanism, means to lock out said freewheel.

28. The combination of claim 26, in combination with a gear transmission between said runner and said driven mechanism, and a freewheel between said transmission and said driven mechanism, said brake when applied on said idle runner tending to drive said runner in reverse direction, means to lock out said freewheel so that said brake creates a slight reverse drive on said driven mechanism through said gear transmission.

29. The combination of claim 26, in combination with a gear transmission between said runner and said driven mechanism, and a freewheel between said transmission and said driven mechanism, said brake when applied converting said fluid drive into a torque converter, means to lock out said freewheel, said means when locking out said freewheel eliminating substantially simultaneously therewith the control of said accelerator over said brake.

30. The combination of an internal combustion engine and accelerator with a fluid drive, comprising an impeller and runner, in combination with a planetary gearing composed of three parts, the driving member, the driven member and the planetary carrier, said impeller in driving connection respectively with said driving member and said runner connected to said driven member to effect thereby temporarily a reverse hydraulic drive through said planetary carrier when stopped, an overrunning brake between said driven member and a stationary member whereby said reverse drive is checked before it reaches the driven mechanism, and means to eliminate said overrunning brake, so that said driven mechanism can be driven in reverse direction.

31. The combination of a prime mover and accelerator and gear transmission with a fluid drive, said prime mover connected to the impeller thereof and said runner being connected with a driven mechanism, an idle runner in operative association with said impeller and runner, said idle runner when stopped tending to drive said runner in reverse direction, an overrunning brake between said runner and said driven mechanism, and means to eliminate said overrunning brake when a mechanical reverse drive is effected by means of said gear transmission between said runner and driven mechanism, said overrunning brake operating between said runner and a stationary part.

32. The combination of a prime mover and accelerator with a hydraulic power transmission of the Föttinger type comprising an impeller and runner connected to two parts of a planetary gearing, comprising three parts, a driving gear, a planetary carrier and a driven gear, said third part being connected to a driven mechanism, an idle runner positioned in operative association with said impeller and runner, said idle runner capable of imparting a variable speed to said planetary carrier associated with said planetary gearing, and thereby a variable speed to said driven mechanism, a brake for said idle runner, said brake being under control of said accelerator of said prime mover connected to said impeller.

33. The combination of claim 32, said control of said accelerator being such that said brake is applied when said accelerator is pushed beyond wide open position, and released, when said accelerator is released.

34. In a vehicle on wheels, the combination of an engine and accelerator and a fluid drive of the constant liquid content, said fluid drive having an impeller and a runner, a reduction gearing between said engine and impeller so that said impeller is driven at part of the engine speed, an idle runner in said fluid drive tending to vary the speed of rotation of the driven mechanism when held stationary, said idle runner having a tendency to vary the pressure of said impeller on said runner, when said idle runner is held stationary by means of a brake under control of the accelerator of said engine.

35. In a vehicle the combination of an engine and fluid drive of the constant liquid content with a planetary gearing composed of three gears, a driving member, a planetary carrier and a driven member connected to a driven mechanism, said fluid drive comprising an impeller and a runner, said engine being connected to the driving member of said planetary gearing, said impeller to the planetary carrier, and said runner to the driven mechanism, an idle runner in said fluid drive, said idle runner having a tendency to vary the rotational speed of said planetary carrier and thereby the speed of rotation of said driven mechanism, and means to hold and keep said idle runner stationary at will.

JEAN A. H. BARKEIJ.